(12) United States Patent
Rayner et al.

(10) Patent No.: US 7,054,173 B2
(45) Date of Patent: May 30, 2006

(54) CIRCUIT WITH DC FILTER HAVING A LINK FUSE SERIALLY CONNECTED BETWEEN A PAIR OF CAPACITORS

(75) Inventors: Mark Rayner, Houston, TX (US); Benjamin A. Ta, Katy, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 10/430,318

(22) Filed: May 7, 2003

(65) Prior Publication Data

US 2004/0223346 A1 Nov. 11, 2004

(51) Int. Cl.
*H02H 7/125* (2006.01)

(52) U.S. Cl. .............. 363/45; 363/53; 361/16
(58) Field of Classification Search .......... 361/16, 361/17; 363/44, 45, 47, 48, 52, 53, 54
See application file for complete search history.

(56) References Cited

U.S. PATENT DOCUMENTS

| 3,562,586 | A | * | 2/1971 | Carter et al. ............. 361/16 |
| 3,755,711 | A | * | 8/1973 | Fendt .................... 361/17 |
| 3,911,324 | A | * | 10/1975 | Bishop .................. 361/18 |
| 4,104,687 | A | * | 8/1978 | Zulaski .................. 361/17 |
| 4,219,856 | A | * | 8/1980 | Danfors et al. ........... 361/15 |
| 4,295,174 | A | * | 10/1981 | Peterson et al. .......... 361/16 |
| 4,405,963 | A | * | 9/1983 | Holtzman ............... 361/16 |
| 4,805,063 | A | * | 2/1989 | Kataoka et al. .......... 361/16 |
| 4,998,098 | A | * | 3/1991 | Schweitzer, III ......... 340/662 |
| 5,475,272 | A | * | 12/1995 | Gothelf ................. 307/109 |
| 5,625,545 | A |   | 4/1997 | Hammond |
| 5,936,854 | A | * | 8/1999 | Uesugi et al. ............ 363/44 |
| 6,084,785 | A | * | 7/2000 | Kunisada et al. ......... 363/37 |
| 6,753,792 | B1 | * | 6/2004 | Beckwith .............. 340/870.07 |

* cited by examiner

*Primary Examiner*—Jeffrey Sterrett
(74) *Attorney, Agent, or Firm*—Banner & Witcoff, Ltd.

(57) ABSTRACT

A circuit that includes a filter and a DC bus is provided that reduces the potential for failure of a second capacitor of the filter in the event a first capacitor shorts. The filter is electrically connected across the DC bus and includes serially connected capacitors and a capacitor fuse electrically connected in series with the capacitors. The capacitor fuse is adapted to open in the event a first capacitor of the series shorts in order to prevent failure of a second capacitor of the series. In one embodiment of the invention, a static power converter includes a pair of serially connected capacitors having a DC bus fuse serially connected therewith. In another embodiment of the invention, a filter connected across a DC bus includes a plurality of capacitor legs that each include a capacitor fuse serially connected to a plurality of serially connected capacitors.

23 Claims, 5 Drawing Sheets

CIRCUIT WITH DC FILTER HAVING A LINK FUSE SERIALLY CONNECTED BETWEEN A PAIR OF CAPACITORS

TECHNICAL FIELD

This invention relates generally to a link fuse arrangement for a DC circuit. More particularly, the invention concerns a DC link fuse arrangement that reduces the possibility for overstressing a smoothing capacitor.

BACKGROUND

Electrical devices that convert an AC input into a steady DC output are generally known as static power converters (SPCs). SPCs typically include a rectifier, a filter and a DC bus. The rectifier rectifies AC power it receives from a utility line or other AC power source into DC power using diodes or power semiconductors. The filter generally includes one or more DC smoothing capacitors connected across the DC bus, which carries output from the rectifier, for smoothing the resultant DC output. The DC filtering capacitors smooth pulsating DC output from the rectifier by absorbing peak currents and ripple currents while providing a source of constant DC voltage. Many conventional filters include one or more capacitors electrically connected in series and/or in parallel. When one of these capacitors shorts, other capacitors serially connected to the shorted capacitor are often overstressed with an in-rush of current, which causes their failure. Such failure is often explosive, thereby causing fire or shock damage to the system.

SPCs have a variety of uses, such as providing input power to an inverter as part of an inverter drive system. Inverters are known in the art as devices that generally receive a DC power source at their input and provide either a single phase or a polyphase AC output. Variable voltage inverters and current source inverters are examples of inverter types known in the art for providing a controlled AC output. In a conventional inverter drive system, an SPC receives raw AC power and converts it into a steady supply of DC power, which the inverter uses to provide controlled AC output to a load. Such systems are common and may be used, for example, to drive an AC motor or to provide power for AC uninterruptible power supplies (UPS's).

One widespread use of an inverter drive system including an SPC is to provide adjustable output power as an adjustable speed drive. Such an adjustable drive system may control, for example, a DC brushless motor, an AC induction motor by acting as a vector controller, or an AC induction motor by acting as an AC variable frequency controller. For instance, a variable frequency drive (VFD) type of adjustable drive system may control an AC synchronous motor by varying the AC output frequency using pulse width modulation (PWM) techniques. Such VFD devices are popular due to their efficiency, energy savings and reliability. Another widespread use of inverter drive systems is for UPS devices, which are increasingly popular for providing a stable AC power supply to sensitive electronic devices, such as computers and printers.

An example of an inverter drive system is shown in FIG. 1, which shows a voltage fed inverter system 10 as is known in the art for providing controlled AC power output. The system 10 includes a rectifier bridge 12, a DC bus 14, a filter 16, and an inverter circuit 18. The rectifier bridge (REC) 12 receives three-phase power from a power source (not shown) via input terminals 20 and converts it to DC power via diodes 22. Typically, between each input terminal 20 and REC 12 there is an in-line fuse 24, which opens in the event of over-current into REC 12. Filter 16 generally includes one or more smoothing capacitors 26, 28 that are often electrically connected in series. Capacitors 26, 28 smooth the potential across DC bus 14 to provide a relatively constant output voltage. The voltage across DC bus 14 provides a controlled input to inverter circuit 18. Inverter circuit 18 is controlled, such as via PWM techniques, to provide a controlled AC power output.

In such conventional systems, DC bus fuse 30 is provided along one or both sides of DC bus 14. If the current through DC bus 14 exceeds a pre-determined level, DC bus fuse 30 opens and disables inverter system 10. For example, if a transistor (not shown) of inverter 18 shorts such that the positive and negative lines of DC bus 14 are directly connected in certain switched modes, an over-current will result through DC bus 14 causing fuse 30 to open. In another example, an over-current condition may occur as a result of one of capacitors 26, 28 shorting; however, this may not occur prior to the matched capacitor also failing. For example, if capacitor 26 shorts, its serially connected matching capacitor 28 receives an in-rush of current that may exceed its rating. Because the increased current to capacitor 28 may not exceed the rating of fuse 30, fuse 30 will remain intact and closed. As such, capacitor 28 may quickly fail before fuse 30 opens. Because of the increased stress to capacitor 28, its failure is likely more severe than the first failed capacitor 26. Thus, the failure of the second capacitor 26 may be hazardous, which could cause fire or shock to the system and create unsafe conditions.

Accordingly, a need exists for a DC bus circuit that prevents hazards associated with failure of a smoothing capacitor. Further, a need exists for a DC bus circuit that prevents the failure of a matched capacitor in the event one capacitor of the series shorts.

SUMMARY OF THE INVENTION

In order to overcome the above-described problems and other problems that will become apparent when reading this specification, the present invention provides a circuit having a DC bus fuse arrangement that reduces the potential for failure of a second capacitor in the event a first capacitor shorts. By reducing the potential for failure of a second capacitor, which failure is often catastrophic, the potential for damage to the associated system and for unsafe conditions is reduced. In one embodiment of the invention, a static power converter includes a pair of serially connected capacitors having a DC bus fuse serially connected therewith. Other features and advantages of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION OF THE FIGURES

Figure 1:
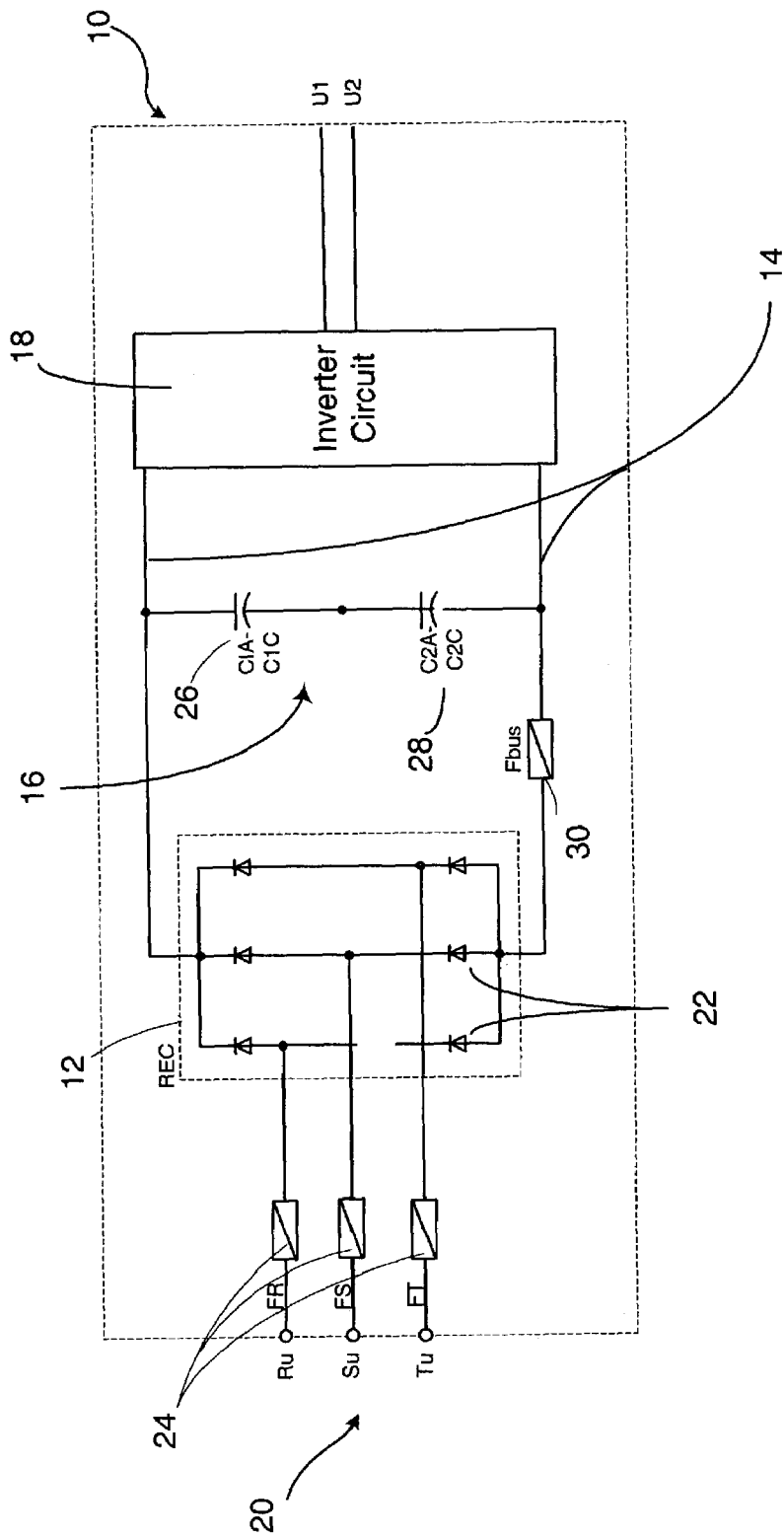
FIG. 1 is a circuit diagram for a voltage fed inverter system having a DC bus fuse as is known in the art.
Figure 2:
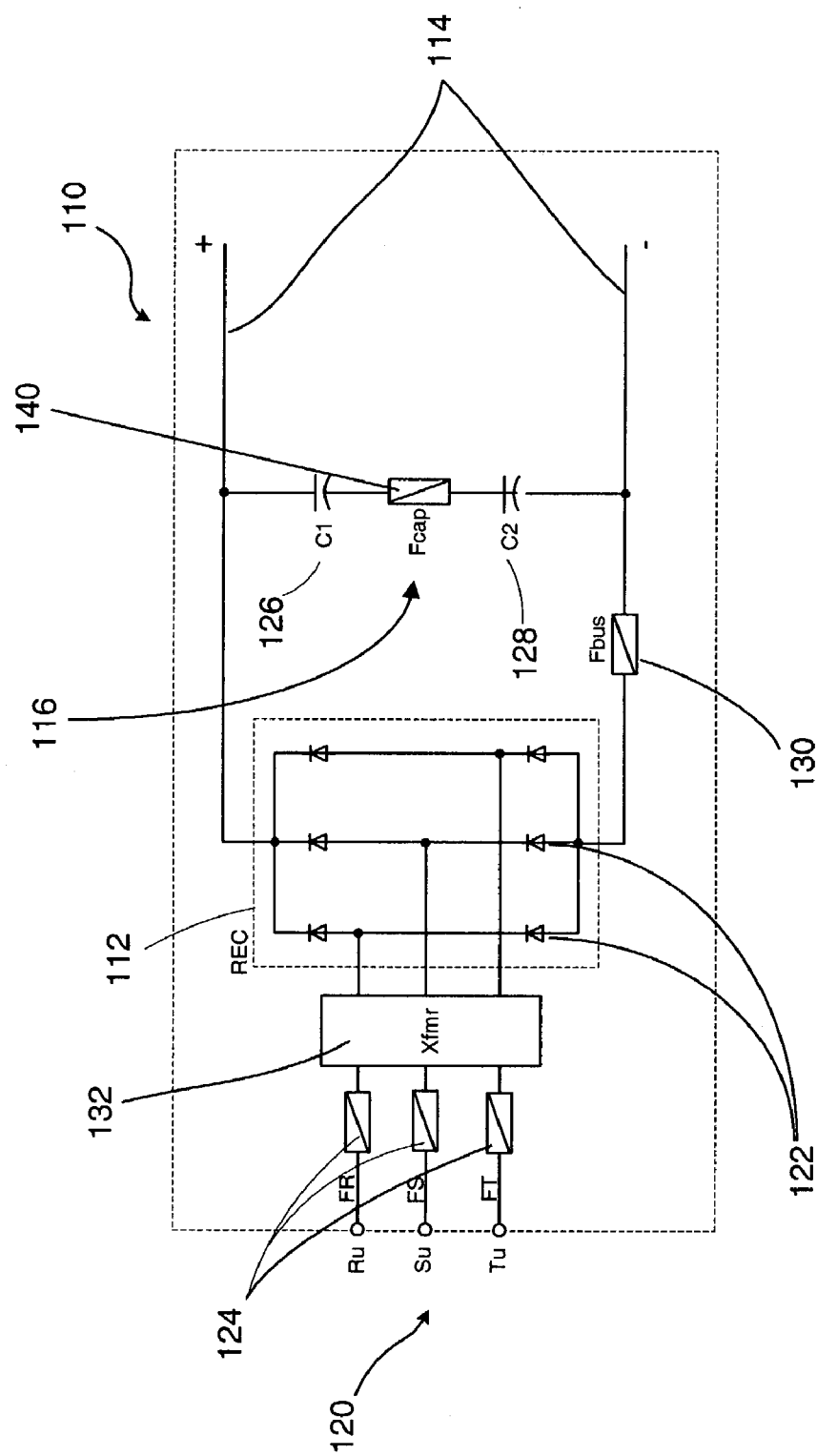
FIG. 2 is a circuit diagram of a static power converter having a DC link fuse according to an embodiment of the invention.

The following description of the figures shows by way of illustration various embodiments in which the invention may be practiced. It is to be understood that other embodiments may be utilized and structural and functional modifications may be made without departing from the scope of the present invention. Referring now to FIG. 2, an AC-to-DC static power converter (SPC) 110 according to an embodiment of the invention is shown. SPC 110 generally includes a rectifier 112, a DC bus 114 and a filter 116. The rectifier (REC) 112 receives three-phase power from a power source (not shown) via input terminals 120 and converts it to DC power via diodes 122; the DC power is output on DC bus 114. Filter 116 smoothes out ripple and pulsations of the DC power output to DC bus 114 from REC 112.

REC 112 is a three-phase bridge rectifier in which six diodes are arranged in the form of three legs, which correspond to each phase of input power. The center point of each leg is connected to the respective phase of the three-phase power supply (not shown). In other embodiments, single-phase or other polyphase AC power sources may provide input power. A transformer 132 may optionally be included between input terminals 120 and REC 112 to step-up or step-down the input voltage as needed or to isolate the power supply. Further, an in-line fuse 124 may optionally be serially connected between each input terminal 120 and REC 112 for opening in the event of over-current into REC 112.

Filter 116 is connected across DC bus 114 to smooth out ripple and pulsations of DC power output from REC 112. Filter 116 includes a pair of smoothing capacitors 126, 128 and a capacitor fuse 140 electrically connected in series with capacitors 126, 128. Preferably, fuse 140 is electrically connected between capacitors 126, 128 and protects either one of the capacitors in the event a first one of the capacitors shorts; however, fuse 140 may protect the capacitors via a serial connection on either side of the pair of capacitors 126, 128. Capacitor fuse 140 is preferably a fast acting semiconductor protection fuse as is known in the art.

A bus fuse 130 is also provided on the negative side of DC bus 114 for protecting SPC 110. If the current through DC bus 114 exceeds a pre-determined level, bus fuse 130 opens and disables SPC 110. For example, if the positive and negative sides of DC bus 114 are directly connected, such as via a short through a load (not shown), an over-current will result in DC bus 114 causing fuse 130 to open. Bus fuse 130, however, may not protect against catastrophic failure of one of the capacitors in the event a first capacitor shorts. Capacitor fuse 140, on the other hand, can prevent failure of a second one of capacitors 126, 128 if a first one of them shorts.

Suppose, as an example, that SPC 110 is receiving 220V, 60 Hz, three-phase input power and is providing 300V of constant DC output to a load (not shown) via DC bus 114. Suppose that bus fuse 130 has a voltage rating of 330V DC and a current rating of 200 A, and capacitor fuse 140 has a voltage rating of 330V DC and a current rating of 50 A. Suppose also that capacitor fuse 140 is a fast acting semiconductor protection fuse that opens within 50 ms at ambient temperatures at 300V with current therethrough exceeding 50 A. Suppose further that capacitors 126, 128 each have a capacitance of 1000 microfarads and are rated for a ripple current of 50 A. As such, connected in series they have a combined capacitance of 500 microfarad. Suppose also that capacitors 126, 128 are liquid-filled capacitors that have a typical life of 2000+hours at 85 degrees C.

Liquid-filled capacitors provide the advantage of high energy density compared with many other types of capacitors, particularly for high voltage applications. However, liquid-filled capacitors, such as electrolytic capacitors and oil-filled capacitors, can be dangerous. For example, internal pressure build-up within such a capacitor may cause the capacitor to leak or a plug on the capacitor to blow and the liquid within to spit out. If the capacitor does not have a plug, an internal pressure build-up can cause the capacitor to break open and even explode. Such a catastrophic failure may cause shock damage to SPC 110. Further, the liquid that escapes from the capacitor may be flammable. Leaked liquid may cause shorts to occur within SPC 110 and thereby cause damage beyond failure of the capacitor. As electrolytic capacitors are typically used for higher voltage systems, and such leaks and other catastrophic failures are generally not likely for lower voltage systems, the present invention is preferably applicable to systems having a DC bus voltage about 50V DC and greater; however, it may be applicable to lower voltage systems as well.

The use of a capacitor fuse 140 in-line with serially connected capacitors 126, 128 may prevent catastrophic failure by opening prior to such failure. Continuing with the previous example, suppose that capacitor 126 shorts as a result of normal wear. Suppose also that the short occurs in concert with a voltage ripple from REC 112. As such, the combined capacitance of capacitors 126, 128 changes from 500 microfarads with both capacitors operational to 1000 microfarads with capacitor 128 operating alone. Due to the increased capacitance and the voltage ripple output from REC 112, suppose capacitor 128 sees a momentary in-rush current of 100 A. Further, suppose capacitor 128 would repeatedly see an input and output current of 75 A while capacitor 126 is in a shorted state. This is due, for example, to charge and discharge cycles in response to pulsating output from REC 112. If left in such a state, capacitor 128 is likely to experience internal pressure build-up as a result of experiencing current greater than its 50 A ripple current rating, which may cause a catastrophic failure.

Capacitor fuse 140 prevents catastrophic failure of capacitor 128 by opening prior to such failure and thereby electrically disconnecting capacitor 128 from the positive leg of DC bus 114. Because the in-rush current of 100 A and the ripple current of 75 A both exceed the rating of capacitor fuse 140, capacitor fuse 140 opens shortly after first capacitor 126 shorts. However, because these currents are both below the 200 A rating of bus fuse 130, bus fuse 130 remains closed and does not prevent catastrophic failure of second capacitor 128. As it may only take a few seconds for the internal pressure of capacitor 128 to build-up to a point that it causes failure of fuse 140, capacitor fuse 140 is preferably a fast-acting semiconductor protection fuse as is known in the art. For example, capacitor fuse 140 may have a short melt time, such as 50 ms, which permits it to open well before the failure of capacitor 128 as caused by the shorting of capacitor 126.

Figure 3:
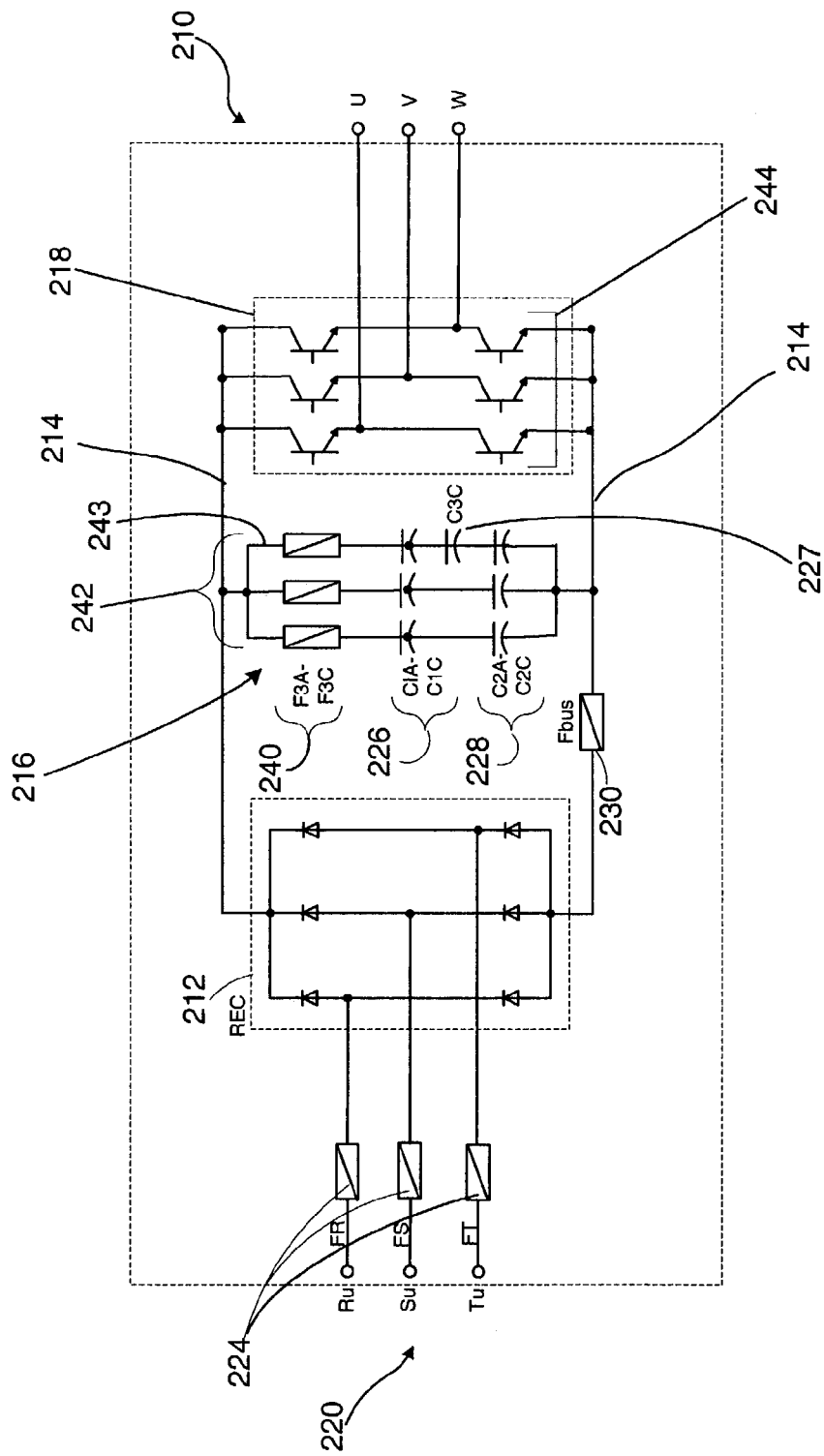
FIG. 3 is a circuit diagram of an inverter drive system having DC link fuses according to another embodiment of the invention.

Referring now to FIG. 3, a voltage-fed inverter drive system 210 is generally shown. Voltage-fed inverter drive system 210 is generally the same as SPC 110, except for aspects and preferences related to the filter and the inverter.

As shown, filter 216 includes a plurality of capacitor legs 242 electrically connected in parallel across DC bus 214. As also shown, inverter 218 is a three-phase bridge inverter including a plurality of power transistors 244 that are controlled, for example, by pulse width modulation (PWM) techniques for providing a controlled AC output. As an example, such a bridge inverter may be used to drive an AC motor (not shown).

Filter 216 is connected across DC bus 214 to smooth out ripple and pulsations of DC power output from REC 212. The multiple capacitor legs 242 of filter 216 are electrically connected in parallel to provide a high overall capacitance, which may be less expensive than fewer high capacitance capacitors. Further, multiple capacitors electrically connected in parallel and/or in series may provide improved filtering, particularly if some of the capacitors have different ratings and properties. For example, a mix of high and low ripple capacitors may provide greater overall filtering capabilities. Each capacitor leg 242 of drive system 210 includes a pair of smoothing capacitors 226, 228. However, one or more legs 242 may include greater or fewer capacitors, such as a third capacitor 227 serially connected with capacitors 226, 228 in filter leg 243.

A capacitor fuse 240 for each leg 242 is electrically connected in series with respective capacitors 226, 227 and 228. Each fuse 240 protects remaining capacitors of the respective leg 242 in the event a first one of the capacitors shorts. Each capacitor fuse 240 is preferably a fast acting semiconductor protection fuse as is known in the art, which is able to open quickly in the event of an over-current through fuse 240 that exceeds its rating. By opening quickly, each fuse 240 is able to electrically disconnect a remaining one(s) of capacitors 226, 227, 228 for its respective leg 242 before failure of the respective remaining capacitor(s) 226, 227, 228.

Suppose, as an example, that drive system 210 is receiving 400V–460V, 60 Hz, three-phase input power and is providing 600V of constant DC output to an AC motor (not shown) via inverter 218. Suppose that bus fuse 230 has a voltage rating of 660V DC and a current rating of 800 A, and each capacitor fuse 240 has a voltage rating of 660V DC and a current rating of 250 A. Suppose also that each capacitor fuse 240 is a fast acting semiconductor protection fuse that opens within 50 ms at ambient temperatures at 660V with current therethrough exceeding 250 A. Suppose further that capacitors 226, 228 each have a capacitance of 1000 microfarads and are rated for a ripple current of 200 A, and that capacitor 227 has a capacitance of 2000 microfarads and is rated for a ripple current of 250 A. As such, connected in series, two of the legs have a combined capacitance of 500 microfarads and leg 243 has a combined capacitance of 400 microfarads. Filter 216 therefore has an overall capacitance of 1400 microfarads. Suppose also that capacitors 226, 227, 228 are liquid-filled capacitors that have a typical life of 2000+hours at 85 degrees C.

As with the previous embodiment, the use of capacitor fuses 240 in-line with respective serially connected capacitors 226, 227, and 228 may prevent catastrophic failure of a filter capacitor by opening prior to such failure. Suppose that capacitor 226 of leg 243 shorts as a result of normal wear and that the short occurs in concert with a voltage ripple from REC 212. As such, the combined capacitance of capacitors 226, 227, 228 changes from 400 microfarads with all three capacitors operational to 667 microfarads with capacitors 227 and 228 operational. Due to the increased capacitance and the voltage ripple output from REC 212, suppose capacitors 227 and 228 see a momentary in-rush current of 350 A. Further, suppose capacitors 227, 228 would repeatedly see an input and output current of 300 A while capacitor 126 is in a shorted state. If left in such a state, capacitors 227, 228 are likely to experience internal pressure build-up as a result of experiencing current greater than their respective 200 A and 250 A ripple current ratings, which may cause a catastrophic failure in either or both of them.

Capacitor fuse 240 of leg 243 prevents catastrophic failure by opening prior to such failure and thereby electrically disconnecting capacitors 227, 228 from one side of DC bus 214. Because the 350 A in-rush current and the 300 A ripple current both exceed the rating of capacitor fuse 240, capacitor fuse 240 opens shortly after capacitor 226 shorts. However, because these currents are both below the 800 A rating of bus fuse 130, bus fuse 130 remains closed and does not prevent catastrophic failure of capacitors 227, 228. As it may only take a few seconds for the internal pressure of capacitors 227, 228 to build-up to a point of failure or leakage, capacitor fuses 240 are preferably fast-acting semiconductor protection fuses as are known in the art. For example, capacitor fuses 240 may have short melt times, such as 50 ms, which permits them to open well before the failure of a capacitor, such as capacitor 128, as caused by the shorting of capacitor 126.

Figure 4:
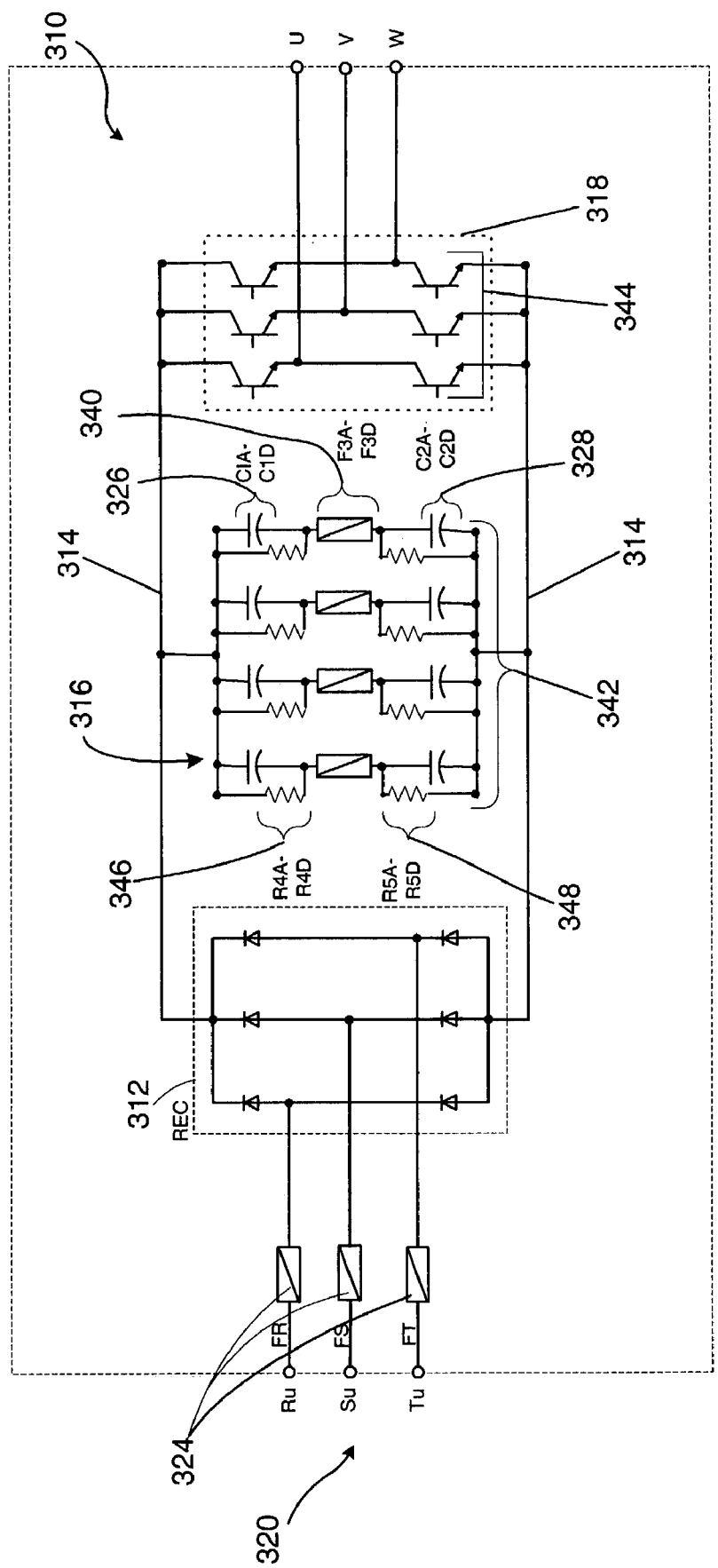
FIG. 4 is a circuit diagram of an adjustable speed drive system having DC link fuses according to a further embodiment of the invention.

Referring now to FIG. 4, an adjustable speed drive system 310 is generally shown. Adjustable speed drive system 310 is generally the same as inverter drive system 210, except for aspects and preferences related to the filter. As shown, filter 316 includes a plurality of capacitor legs 342 electrically connected in parallel across DC bus 314. As also shown, inverter 318 is a three-phase bridge inverter including a plurality of power transistors 344 that are controlled, for example, by pulse width modulation (PWM) techniques for providing a controlled output. As an example, such a bridge inverter may be used to drive an AC synchronous motor (not shown) by varying the frequency of three-phase AC output from inverter 318. Instead of a bus fuse, system 310 relies on input fuses 324 to generally protect the system against over-current through DC bus 314 and into rectifier 312.

Filter 316 is connected across DC bus 314 to smooth out ripple and pulsations of DC power output from REC 312. The multiple capacitor legs 342 of filter 316 are electrically connected in parallel, and each capacitor leg 342 includes a pair of smoothing capacitors 326, 328; a corresponding pair of bleeding resistors 346, 348; and a capacitor fuse 340. Each capacitor fuse 340 is electrically connected in series with respective capacitors 326 and 328. Each fuse 340 protects remaining capacitors of the respective leg 342 in the event a first one of the capacitors shorts. Each capacitor fuse 340 is preferably a fast acting semiconductor protection fuse as is known in the art, which is able to open quickly in the event of an over-current through fuse 340 that exceeds its rating. By opening quickly, each fuse 340 is able to electrically disconnect a remaining one of capacitors 326, 328 for its respective leg 342 before failure of the respective remaining capacitor 326, 328.

To improve filter performance and provide additional safety in the event of capacitor failure, a bleeding resistor 346, 348 is electrically connected across each capacitor 326, 328. Bleeding resistors 346, 348 can improve operation of filter 316 by reducing voltage buildup in the capacitors, which permits additional absorption of over-voltage from rectifier 312. Additionally, bleeding resistors 346, 348 reduce the potential of shock damage to the system, or injury to a person, from contact with charged capacitors in the event of capacitor failure or other system failure. For example, if one of capacitor resistors 340 opens, the adjacent capacitors are electrically disconnected, which reduce their ability to discharge voltage stored therein. A charged capacitor can present a danger to personnel or to a damaged system, such as one in which oil from an oil-filled capacitor has leaked. Bleeding resistors 346, 348 reduce these dangers by allowing charged capacitors to discharge through a respective bleeding resistor 346, 348.

Suppose, as an example, that adjustable speed drive system 310 is receiving 400V–460V, 60 Hz, three-phase input power and is providing 600V of constant DC output to an AC synchronous motor (not shown) via inverter 318. Suppose that input fuses 324 each have a voltage rating of 660V DC and a current rating of 800 A, and each capacitor fuse 340 has a voltage rating of 660V DC and a current rating of 250 A. Suppose also that each capacitor fuse 340 is a fast acting semiconductor protection fuse that opens within 50 ms at ambient temperatures at 660V with current therethrough exceeding 250 A. Suppose further that capacitors 326, 328 each have a capacitance of 12000 microfarads and are rated for a ripple current of 250 A. As such, connected in series, each leg 342 has a combined capacitance of 6000 microfarads. Filter 316 therefore has an overall capacitance of 24000 microfarads. Suppose also that capacitors 326, 328 are liquid-filled capacitors that have a typical life of 2000+hours at 85 degrees C.

The use of capacitor fuses 340 in-line with respective serially connected capacitors 326, 328 may prevent catastrophic failure of a filter capacitor by opening prior to such failure. Suppose that capacitor 326 of one leg 342 shorts as a result of normal wear and that the short occurs in concert with a voltage ripple from REC 312. As such, the combined capacitance of capacitors 326, 328 for that leg 342 changes from 6000 microfarads with both capacitors operational to 12000 microfarads with respective capacitor 328 acting alone. Due to the increased capacitance and the voltage ripple output from REC 312, suppose capacitor 328 of shorted leg sees a momentary in-rush current of 350 A. Further, suppose capacitors 328 would repeatedly see an input and output current of 300 A while respective capacitor 326 is in a shorted state. If left in such a state, capacitor 328 is likely to experience internal pressure build-up as a result of experiencing current greater than its respective 250 A ripple current ratings, which may cause a catastrophic failure in it.

Capacitor fuse 340 of the respective leg 342 prevents catastrophic failure by opening prior to such failure and thereby electrically disconnecting respective capacitor 328 from DC bus 314. Because the 350 A in-rush current and the 300 A ripple current both exceed the rating of capacitor fuse 340, capacitor fuse 340 opens shortly after capacitor 326 shorts. However, because these currents are both below the 800 A rating of the input fuses 324, input fuses 324 remain closed and do not prevent catastrophic failure of capacitor 328. As it may only take a few seconds for the internal pressure of capacitor 328 to build-up to a point of failure or leakage, capacitor fuse 340 is preferably fast-acting semiconductor protection fuses as are known in the art. For example, capacitor fuse 340 may have a short melt times, such as 50 ms, which permits it to open well before the failure of a capacitor, such as capacitor 328, as caused by the shorting of capacitor 326. Once capacitor fuse 340 opens, voltage stored in capacitor 328 may be safely discharged via corresponding bleeding resistor 346.

Figure 5:
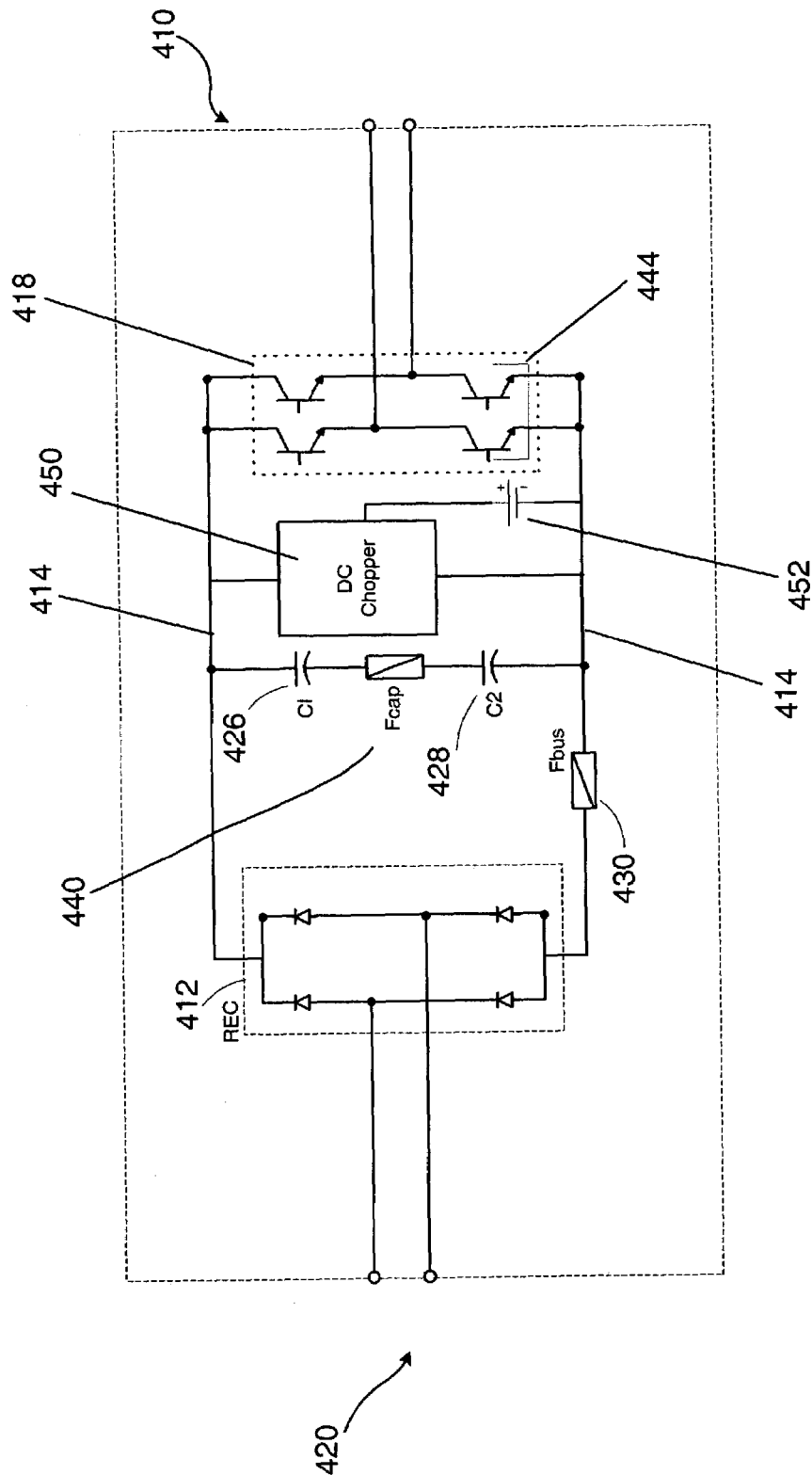
FIG. 5 is a circuit diagram of an uninterruptible power supply system having a DC link fuse according to yet another embodiment of the invention.

Referring now to FIG. 5, an uninterruptible power supply (UPS) 410 is generally shown. UPS 410 is generally the same as SPC 110, except for aspects and preferences related to single-phase power input, the inverter 418, the DC chopper 450 and the battery 452. As shown, rectifier 412 receives single-phase input power, such as household 110V, 60 Hz power. As also shown, inverter 418 is a single-phase bridge inverter including a plurality of power transistors 444 that are switched for providing a controlled AC output. As an example, such a bridge inverter may be used to provide controlled 110V, 60 Hz output to various loads (not shown).

DC chopper 450 is a DC-to-DC converter as is known in the art that transfers power as necessary to and from battery 452. Battery 452 receives charging power from DC chopper 450 when rectifier 412 is receiving input power, and provides DC power output to DC bus 414 via DC chopper 450 when input power to rectifier 412 is interrupted. As such, constant DC input power is provided to inverter 418 regardless of input power interruptions to rectifier 412. Thus, uninterruptible AC output power is provided to the load (not shown).

Filter 416 is connected across DC bus 414 to smooth out ripple and pulsations of DC power output from REC 412. A capacitor fuse 440 is electrically connected in series with respective capacitors 426 and 428. Fuse 440 protects the remaining capacitor in the event a first one of the capacitors shorts. The capacitor fuse 440 is preferably a fast acting semiconductor protection fuse as is known in the art, which is able to open quickly in the event of an over-current through fuse 440 that exceeds its rating. By opening quickly, fuse 440 is able to electrically disconnect the remaining one of capacitors 426, 428 before failure of the remaining capacitor 426, 428.

While the present invention has been described in connection with the illustrated embodiments, it will be appreciated and understood that modifications may be made without departing from the true spirit and scope of the invention. In particular, the invention applies to various types of systems having a filter connected across a DC bus.

We claim:

1. An AC-to-DC static power converter for providing a substantially stable DC power output, the static power converter comprising:
   a rectifier receiving AC power input and providing DC power output;
   a DC bus receiving the DC power output the DC bus having a positive line and a negative line; and
   a filter connected across the positive and negative lines of the DC bus, the filter comprising:
      a first liquid-filled capacitor unit directly connected to the positive line without connecting through a fuse;
      a second liquid-filled capacitor unit electrically connected in series with the first capacitor unit, the second liquid-filled capacitor unit directly connected to the negative line without connecting through a fuse; and
      a first fuse electrically connected in series between the first and second capacitor units and disposed external of the first and second liquid-filled capacitor units.

2. The static power converter of claim 1, wherein the first capacitor unit comprises an electrolytic capacitor.

3. The static power converter of claim 1, wherein the first capacitor unit, the fuse and second capacitor unit together comprise a first leg of the filter, the filter further comprising a second leg electrically connected in a parallel with the first leg, the second leg comprising:
   a third liquid-filled capacitor unit directly connected to the positive line without connecting through a fuse;
   a fourth liquid-filled capacitor unit electrically connected in series with the third capacitor unit, the second liquid-filled capacitor unit directly connected to the negative line without connecting through a fuse; and a second fuse electrically connected in series between the third and fourth capacitor units.

4. The static power converter of claim 1, wherein the fuse comprises a single fast acting fuse having a melting time at a threshold current that exceeds a failure time for one of the first and second capacitor units for the threshold current.

5. The static power convener of claim 1, further comprising an in-line fuse serially connected in one of the positive and negative lines of the DC bus, the in-line fuse having a current rating that exceeds a current rating of the first fuse.

6. The static power converter of claim 1, wherein the rectifier receives three-phase AC power input and provides single-phase DC power output.

7. The static power converter of claim 1, wherein a rating for the first fuse is determined by the capacitance of the first and second capacitor units, the AC power input, and the DC power output.

8. The static power converter of claim 1, wherein the filter comprises a single serial line across the positive and negative lines and the single serial line includes the capacitor units and the first fuse.

9. A drive system for providing power to a load, the drive system comprising:

a rectifier receiving AC power input and providing DC power output;

a DC bus receiving the DC power output the DC bus having a positive line and a negative line;

a filter connected across the positive and negative lines of the DC bus, the filter comprising:

a first pair of serially connected liquid-filled capacitor units, a first one of the first pair of capacitor units directly connected to the positive line without connecting through a fuse and a second one of the first pair of capacitor units directly connected to the negative line without connecting through a fuse; and a first fuse connected in series between the serially connected capacitor units and disposed external of each capacitor unit of the pair of serially connected liquid-filled capacitor units; and an output power circuit having a plurality of controllable electronic switches, the output power circuit being electrically connected to the DC bus for receiving substantially stable DC power, the output power circuit providing controlled output power based on control of the electronic switches.

10. The drive system of claim 9, wherein the output power circuit comprises an AC inverter.

11. The drive system of claim 10, wherein the drive system comprises an uninterruptible power supply, the drive system further comprising a DC chopper connected to the DC bus for charging and discharging a battery connected to the DC chopper, the battery for supplying power in the event the AC power input to the rectifier is interrupted.

12. The drive system of claim 10, wherein the AC inverter comprises a voltage fed inverter.

13. The drive system of claim 12, wherein the voltage fed inverter comprises a variable frequency inverter.

14. The drive system of claim 13, wherein the AC inverter comprises a current source inverter.

15. The drive system of claim 9, wherein the capacitor units and the fuse together comprise a first branch of the filter, the filter further comprising a second branch electrically connected in a parallel with the first branch, the second branch comprising:

a plurality of second serially connected capacitor units, a first one of the second pair of capacitor units directly connected to the positive line without connecting through a fuse and a second one of the second pair of capacitor units directly connected to the negative line without connecting through a fuse; and a second fuse connected in series with the second serially connected capacitor units.

16. The drive system of claim 9, wherein the first fuse comprises a single fast acting fuse having a melting time at a threshold current that exceeds a failure time for the capacitor units at the threshold current.

17. The drive system of claim 9, further comprising an in-line fuse serially connected in one of the positive and negative lines of the DC bus, the in-line fuse having a current rating that exceeds a current rating for the first fuse.

18. The drive system of claim 9, wherein the rectifier receives three-phase AC power input and provides single-phase power output.

19. The drive system of claim 9, wherein a rating for the first fuse is determined by the capacitance of the first serially connected capacitor units, the AC power input and the DC power output.

20. The drive system of claim 9, wherein the filter comprises a single serial line across the positive and negative lines and the single serial line includes the pair of capacitor units and the first fuse.

21. The drive system of claim 9, wherein the liquid-filled capacitor units each comprise an electrolytic capacitor.

22. An adjustable speed drive comprising:

a rectifier receiving three-phase AC power input and providing single-phase DC power output;

a DC bus receiving the DC power output the DC bus having a positive line and a negative line; and a filter connected across the positive and negative lines of the DC bus, the filter comprising:

a first branch, the first branch comprising:

a first electrolytic capacitor directly connected to the positive line without connecting through a fuse;

a second electrolytic capacitor electrically connected in series with the first electrolytic capacitor and directly connected to the negative line without connecting through a fuse; and a first fuse electrically connected in series between the first and second electrolytic capacitors and disposed external of the first and second electrolytic capacitors; and a second branch electrically connected in parallel with the first branch, the second branch comprising:

a third electrolytic capacitor directly connected to the positive line without connecting through a fuse;

a fourth electrolytic capacitor electrically connected in series with the third electrolytic capacitor and directly connected to the negative line without connecting through a fuse; and a second fuse electrically connected in series between the third and fourth electrolytic capacitors and disposed external of the third and fourth electrolytic capacitors.

23. A method of preventing failure of a second liquid-filled capacitor unit of a filter in a static power converter in the event a serially connected first liquid-filled capacitor unit shorts, the first and second capacitor units being serially connected to each other across the positive and negative lines of a DC bus of the static power converter, the method comprising:
  providing a DC voltage potential across the positive and negative lines of the DC bus; and
  providing an electrical connection directly to a first one of the first and second capacitor units from the positive line of the DC bus without connecting through a fuse;
  providing an electrical connection directly to a second one of the first and second capacitor units from the negative line of the DC bus without connecting through a fuse;
  in response to shorting a first one of the first and second capacitor units, electrically disconnecting a second one of the first and second capacitor units from one of the positive and negative lines of the DC bus;
  wherein the step of electrically disconnecting comprises the step of opening a fuse electrically connected in series between the first and second capacitor units and disposed external of the first and second capacitor units.

* * * * *